Feb. 24, 1959

T. F. ROSING ET AL

THERMAL DEVICES

Filed Feb. 25, 1957

2,875,297

Inventors
Arthur J. Kolb
Clarence W. Kuhn
Theodore F. Rosing
By H R Rather
Attorney United States Patent Office 2,875,297

Patented Feb. 24, 1959

2,875,297

THERMAL DEVICES

Theodore F. Rosing, Whitefish Bay, Arthur F. Kolb, Milwaukee, and Clarence W. Kuhn, Wauwatosa, Wis., assignors to Cutler-Hammer, Inc., Milwaukee, Wis., a corporation of Delaware Application February 25, 1957, Serial No. 642,132

13 Claims. (Cl. 200—124)

This invention relates to improvements in thermal devices. More specifically the invention relates to improvements in thermally sensitive devices of the eutectic type.

While not limited thereto, the devices of the present invention are particularly adapted for use in electrical overload protective switches which in certain respects resemble and are improvements on switches disclosed in Kuhn Patent No. 2,522,048, and Kuhn et al. Patent No. 2,673,268.

Losses occurring in the exchange of heat between the heat producing source and the eutectic material in some existing forms of thermally sensitive devices tend to inhibit rapid and accurate response and to inhibit improved sensitivity to changes in current flow within the heat producing source associated with a circuit being afforded overload protection. It is desirable, therefore, to keep such heat losses at a minimum in order to improve the response and sensitivity characteristics of the overload protective switches or other apparatus in which the thermally sensitive device is employed.

Consequently, it is an object of the invention to provide improved thermal devices which respond more rapidly to current increases.

Another object is to provide improved thermal devices which respond more accurately to current increases.

Still another object is to provide improved thermal devices which have greater sensitivity to current increases.

A further object is to provide such improved thermal devices wherein the heat producing source and the thermally sensitive element form a composite unit.

A still further object is to provide improved thermal devices of the eutectic type wherein an extremely efficient heating relationship exists between the heat producing source and the eutectic material within the device.

An additional object is to provide improved forms of heat producing sources for use with thermally sensitive elements.

Other objects and advantages of the invention will hereinafter appear.

The accompanying drawing illustrates certain preferred embodiments of the invention which will now be described, it being understood that the embodiments illustrated are susceptible of various modifications with respect to the details thereof without departing from the scope of the appended claims.

Figure 1:
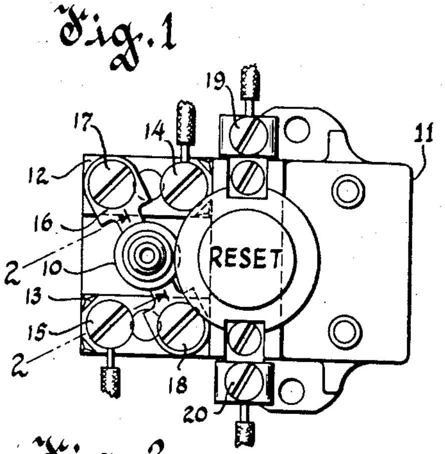
Figure 1 is a top plan view of an electrical overload protective switch unit with an improved thermal device mounted thereon.

Referring to Fig. 1, one form of an improved thermal device 10 is mounted on an overload protective switch unit 11 similar to switches disclosed in patents referred to hereinbefore. Switch unit 11 is associated with devices or circuits being afforded overload protection. Certain conductors thereof which exhibit increased current flow upon occurrence of an overload are connected to terminal plates 12 and 13 of switch unit 11 by binding screws 14 and 15, respectively. Upon occurrence of an overload, a predetermined amount of heat generated by increased current flow through the heat producing source (heater strap 16) of thermal device 11 shown connected across plates 12 and 13 by binding screws 17 and 18, respectively, acting upon the thermally sensitive portions of thermal device 10 effects response of thermal device 10 to permit contacts (not shown) within switch unit 11 to open. Opening of said contacts interrupts a control circuit, certain conductors of which are shown connected to terminals 19 and 20 thereby effecting deenergization (through means not shown) of the conductors connected to binding screws 14 and 15.

Figure 2:
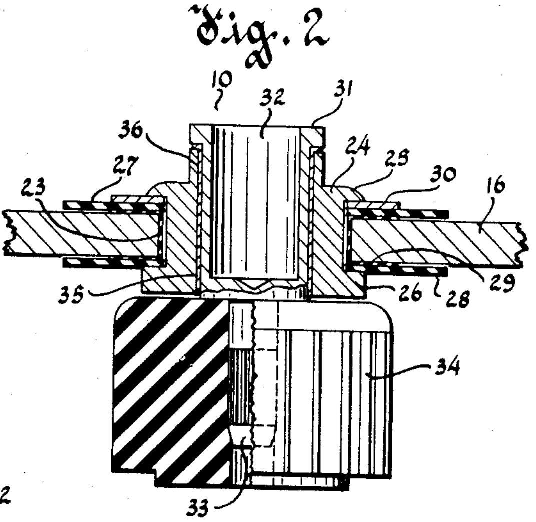
Fig. 2 is an enlarged sectional view of portions of the thermal device taken along line 2—2 of Fig. 1.
Figure 3:
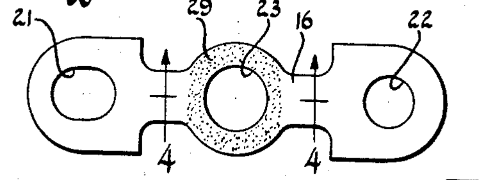
Fig. 3 is a top plan view of a heater strap employed in the several forms of thermal devices disclosed herein.
Figure 4:
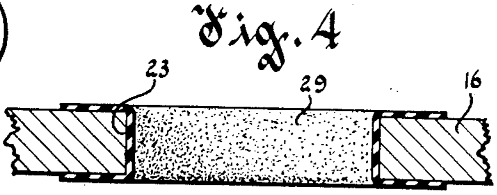
Fig. 4 is a greatly enlarged sectional view of a portion of the heater strap taken along line 4—4 of Fig. 3.

The construction and operational principles of thermal device 10 are best understood by reference to Figs. 1 through 4. Referring to Figs. 2 and 3, a heater strap 16 formed of high ohmic resistance material, preferably nickel-chromium alloys or the like, and having a shape and dimensions causing it to exhibit desired heating characteristics as predetermined amounts of electrical current flow therethrough serves as the heat producing source of thermal device 10 and as the supporting member for the other components of thermal device 10. Openings 21 and 22 near the ends of strap 16 are adapted for mounting thermal device 10 upon switch unit 11 or other devices with which it is to be associated. A circular opening 23 through the central portion of strap 16 is adapted to receive portions of a sleeve 24, preferably of brass or similar material, which is fixedly mounted on strap 16 by flanges 25 and 26, but insulated from electrical contact therewith by circular washers 27 and 28, preferably formed of thin mica sheeting or other suitable insulating material, and by a relatively thin coating of insulating material 29 which is bonded by firing, baking or other means to the inner wall of opening 23 and the surfaces of strap 16 adjacent thereto as shown in Figs. 3 and 4. Insulating material 29, the thickness of which is shown as somewhat exaggerated in Figs. 2 and 4 for the sake of clarity, preferably is a silicone compound but other materials such as glass, ceramic or like substances capable of withstanding extremely high operating temperatures may be used. It is preferred that the thickness of the coating not exceed .002 (two thousandths) of an inch so that a close heating relation will exist between strap 16 and the portions of brass sleeve 24 intimately associated therewith. Electrically insulating strap 16 from metallic sleeve 24 is necessary to prevent short circuiting therebetween which would otherwise impair the accuracy and dependability of thermal device 10. A relatively thin washer 30, preferably formed of stainless steel or other strong, corrosion resistant material having low thermal conductivity, serves to prevent damage to mica washer 27 adjacent thereto as flange 25 is spun down or otherwise appropriately formed to secure sleeve 24 to strap 16. A stainless steel rotor 31 having a recessed or cup-like portion 32 and a knurled stem portion 33 to which a ratchet wheel 34, preferably formed of a phenolic insulating material, is fixedly secured is partially coated within sleeve 24 and is normally bonded and held immobile with respect thereto by a eutectic substance or fusible alloy 35 which occupies the thin space 36 between the outer wall surface of rotor 31 and the inner wall surface of sleeve 24. It is preferred that the eutectic film between sleeve 24 and rotor 31 be as thin as possible consistent with the shear strength requirements so that any tendency of rotor 31 to wobble within sleeve 24 will be reduced and so that eutectic substance 35 can be heated rapidly. Eutectic substances having various critical temperatures, depending upon their composition, may be employed as desired. It is to be understood that rotor 31 is maintained within sleeve 24 when eutectic substance 35 is in its melted state by the action of the flanged portion of rotor 31 on sleeve 24 and by the action of ratchet wheel 34 against the lower flange 26 of sleeve 24. The flanged portion of rotor 31 and ratchet wheel 34 also tends to prevent the loss of eutectic substance 35 when in its liquid state.

It is understood that heat generated in strap 16 by excessive current flow therethrough is transferred to eutectic substance 35 which melts when it absorbs a quantity of heat sufficient to raise it to or beyond its critical temperature thus freeing rotor 31 for movement. Means (not shown) within switch unit 11 in biased engagement with ratchet wheel 34 are thereby able to move under its bias to effect opening of contacts (not shown) within switch unit 11. Upon cooling and re-solidification of eutectic substance 35, rotor 31 is again bonded to sleeve 24 and ratchet wheel 34 is in condition to be re-engaged by the aforementioned means within switch unit 11.

It is apparent from the foregoing description and from the drawing that heat transfer from heater element 16 to eutectic substance 35, accomplished chiefly by conduction, is rapid and efficient and that the thermal characteristics, form, relationship and physical location of the material employed play an important part in the invention disclosed herein. Figs. 2 and 3 show that the inner surface of opening 23 surrounds highly conductive brass sleeve 24 and that flanges 25 and 26 entrap heater element 16 therebetween so that sleeve 24 is subjected to heating from all sides. This heat is quickly transferred to the large surface area of the thin film of eutectic alloy 35. The narrowed portions of heater strap 16 act as heat traps and tend to inhibit heat losses therefrom by heat flowing toward the ends of the strap to the mounting means. Heat dissipation to the atmosphere from sleeve 24 is retarded by the relatively small area thereof exposed to the atmosphere. Loss by conduction through washers 27 and 28 is negligible because they are of mica. Loss through washer 30 is small because stainless steel has relatively low thermal conductivity and only small portions thereof are in contact with sleeve 24 and with the surrounding atmosphere. Heat is absorbed quickly from brass sleeve 24 by highly conductive eutectic substance 35 and is retained and utilized thereby. Rotor 31 has little tendency to absorb heat from film 35 because it too is made of stainless steel, has a polished coating on its outer surface which tends to reflect heat back toward the eutectic film 35, has a relatively low mass due to recess 32, and has relatively little of its area exposed to the cooling effects of the surrounding atmosphere. Relatively small stem portion 33 does not tend to absorb and dissipate heat because of its small mass, its relatively distant location with respect to those portions of rotor 31 which are subject to some heating, and because the bottom wall or rotor 31 within recessed portion 32 is narrowed or tapered as shown in Fig. 2, which taper tends to retard heat flow to stem 33. Furthermore, ratchet wheel 34 formed of material having relatively low thermal conductivity, has little tendency to absorb heat from stem 33.

Obviously, materials having relatively higher or lower thermal conductivity, as their particular function in the thermal device requires, may be utilized in shapes other than those disclosed herein.

Figure 5:
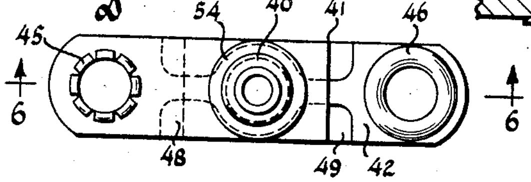
Fig. 5 is a top plan view of a thermal device employing an alternative form of heat producing source.
Figure 6:
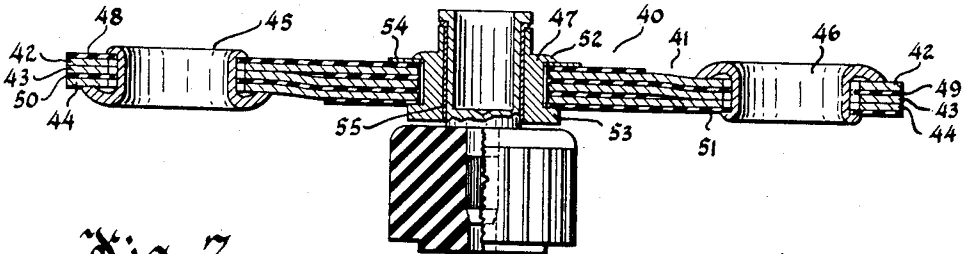
Fig. 6 is an enlarged sectional view of the alternative thermal device taken along line 6—6 of Fig. 5.
Figure 7:
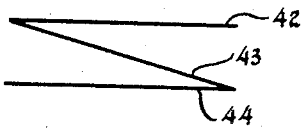
Fig. 7 is a diagram depicting the current path through the thermal device shown in Figs. 5 and 6.

Figs. 5 through 7 refer to a thermal device 40 similar to thermal device 10 but differing therefrom with respect to the type of heat producing source employed. Whereas device 10 employs a single heater strap 16 as its heater element and support, device 40 utilizes a heat producing source or heater element 41 comprised of three heater straps 42, 43 and 44 held in stacked relation by electrically conductive grommets 45 and 46 and by flanged brass sleeve 47 which in the embodiment shown has the same dimension as sleeve 24 shown in Fig. 2. The straps are insulated from each other by mica strips 48, 49, 50 and 51 and are serially connected so that current flow therethrough follows the path diagrammatically depicted in Fig. 7. Preferably, straps 42, 43 and 44 have the same shape and mounting dimensions as strap 16 shown in Fig. 3 and are made of the same material but each strap is relatively thinner. Each strap is insulated within and about its central opening as shown in Figs. 3 and 4 and explained in connection with strap 16 of device 10 to prevent short circuiting. The number of such straps that can be employed in a thermal device such as 40 may be more than that shown and is controlled by the distance between flanges 52 and 53 of sleeve 47, the thickness of the heater straps and the thickness of the mica insulating strips employed, provided that an odd number of straps is used. Mica insulating strips 48, 49, 50 and 51 have the configuration shown in Fig. 5 and are disposed with respect to straps 42, 43 and 44 as shown in Fig. 6 so that mica strip 48, protected from flange 52 by stainless steel washer 54, electrically insulates heater strap 42 from sleeve 47 and terminal grommet 45, mica strip 49 insulates portions of strap 42 from portions of strap 43, mica strip 50 insulates portions of strap 43 from portions of strap 44, and mica strip 51 insulates strap 44 from brass sleeve 47 and terminal grommet 46. It is apparent from Fig. 6 that grommet 45 is in electrical contact only with heater strap 44 and that grommet 46 is in contact only with heater strap 42, contact between the grommets and the other straps being prevented by having the recess for receiving the grommets in the heater straps of greater diameter than the recess in the mica strips. If preferred, insulating material may surround grommets 45 and 46 to prevent short circuiting of the heater straps.

With thermal device 40 associated with switch unit 11 or other appropriate devices, excess current flow from grommet 46, through heater straps 42, 43, 44 to grommet 45, or vice versa as is clear from Fig. 7, heat generated thereby in heater element 41 is transferred to eutectic substance 55 in the same manner and with the same result as explained in connection with thermal device 10 hereinbefore. In addition to incorporating all of the features and advantages explained in connection with thermal device 10, thermal device 40 has greater sensitivity to relatively lower current flow and to smaller changes in current flow than device 10. Although changes in current flow through an individual strap in heater source 41 might be insufficient to cause effective temperature change, because of the additive effect of a multiplicity of straps disposed as shown a sufficient quantity of heat will be exchanged to eutectic substance 55 to melt it. It will be noticed that because of the shape and disposition of mica strips 48, 49, 50 and 51 heat loss from the heater straps to the atmosphere is inhibited.

It is apparent from the foregoing that the novel thermal devices disclosed herein have the advantage of greater efficiency, increased sensitivity to current flow, more rapid and more accurate response to current increase, mechanical simplicity, compactness of design, are conveniently replaced when defective, and can be used interchangeably on various devices, as well as having many other advantages.

We claim:

1. As a thermal responsive device for association with electrical protective devices, in combination, a heater element for carrying an electrical current adapted for mounting on said protective device, said element comprising at least one member of electrically resistive material having an opening therein, a sleeve carried by said element having portions within said opening in proximity to the wall of said opening and having other portions closely adjacent with portions of said element adjacent said opening, a movable rotor having portions within said sleeve, fusible alloy normally bonding said rotor to said sleeve, and a ratchet wheel affixed to and movable with said rotor to permit actuation of biased means within said protective device when predetermined heating of said element caused by excessive current flow therethrough fuses said alloy.

2. The combination according to claim 1 wherein insulating material is disposed between portions of said heater element and said sleeve.

3. In a current carrying thermal responsive device for association with an overload protective device, in combination, heating means adapted for mounting on said protective device, said means having an opening therethrough and said means comprising at least one member of electrically resistive material, a flanged sleeve supported by and fixed relative to said heating means within said opening in intimate physical relation with the wall of said opening and portions of said heating means adjacent thereto, said sleeve comprised of material having high thermal conductivity, means for insulating said sleeve from electrical contact with said heating means, said means tending to inhibit heat dissipation from said heating means to the atmosphere, a movable rotor having portions within said sleeve, said rotor comprised of material having low thermal conductivity and which is shaped and arranged to retard heat dissipation therefrom, fusible alloy normally bonding said rotor to said sleeve, and ratchet means mounted on and movable with said rotor for engaging means within said protective device to effect actuation of said protective device as a predetermined amount of heat generated in said heating means by excessive current flow therethrough melts said alloy, said ratchet means comprising material having low thermal conductivity and disposed with respect to said sleeve and rotor so as to retard heat dissipation therefrom.

4. The combination according to claim 3 wherein said sleeve is of brass, said rotor is of stainless steel, said ratchet is of phenolic material and said means for insulating comprising mica washers and silicatious material bonded to said heater strap by firing.

5. The combination according to claim 3 wherein said heating means comprises a plurality of serially connected electrically resistive members held in stacked relationship, and insulating means disposed about said members to prevent short circuiting therebetween.

6. As a thermal device for mounting on an overload protective device, in combination, a heater element adapted for mounting on said protective device, said element comprising at least one electrically resistive heater strap having an opening therein, insulating material bonded to said strap about said opening, a sleeve supported by said element having portions within said opening and other portions intimately associated with other portions of said element, insulating means disposed between said other portions of said sleeve and said other portions of said element, protective means between said other portions of said sleeve and portions of said insulating means, a movable rotor within said sleeve, a ratchet wheel affixed to and movable with said rotor, and a fusible alloy bonding said rotor to said sleeve at predetermined temperatures.

7. The combination according to claim 6 wherein said heater element comprises a multiplicity of electrically resistive heater straps having openings therein and having silicatious insulating material bonded to said straps about said openings, said straps being in stacked relation, serially connected near their end portions and insulated from each other and from said sleeve by insulating material disposed about said straps.

8. The combination according to claim 7 wherein metallic grommets assist in holding said straps in stacked relation.

9. As a thermal device for use with an overload protective device, in combination, an electrically resistive heater strap adapted for mounting on said protective device, said strap having an opening therethrough, silicatious insulating material bonded to said strap within and about said opening, a flanged brass sleeve carried by said strap, said sleeve having portions within said opening and flanged portions proximately disposed with respect to portions of the surfaces of said strap adjacent to said opening, mica washers between said flanges of said sleeve and said strap, a stainless steel washer between one of said flanges and one of said mica washers, a movable stainless steel cup-like rotor having portions within said sleeve, a phenolic ratchet wheel affixed to and movable with said rotor, and a fusible alloy bonding said rotor to said sleeve at predetermined temperatures.

10. The combination according to claim 9 wherein the thickness of said silicatious insulating material bonded to said strap does not exceed two thousandths of an inch.

11. As a thermal device for use with overload protective devices, in combination, a flanged sleeve, a movable rotor having portions within said sleeve, a ratchet wheel carried by and movable with said rotor, fusible alloy normally bonding said rotor to said sleeve, and a heater element adapted to surround and carry said flanged sleeve, said element comprising a multiplicity of heater straps having openings therethrough serially connected and held in stacked relation by the flanges of said sleeve and by grommets through openings in the end portions of said straps, said straps insulated from undesired electrical contact with each other, with said sleeve and with said grommets by insulating material disposed about said straps.

12. The combinations according to claim 11 wherein said heater straps have a coating of silicatious insulating material bonded to said heater straps about said openings.

13. The combination according to claim 12 wherein said insulating material disposed about said straps comprises strips of mica.

References Cited in the file of this patent

UNITED STATES PATENTS

| | | |
|---|---|---|
| 1,752,514 | Van Valkenburg | Apr. 1, 1930 |
| 1,944,832 | Wilms et al. | Jan. 23, 1934 |
| 2,743,326 | Matthias | Apr. 24, 1956 |